(12) United States Patent
Evans et al.

(10) Patent No.: US 6,457,560 B1
(45) Date of Patent: Oct. 1, 2002

(54) GEAR BOX OIL PUMPING SYSTEM

(75) Inventors: Arthur Leon Evans, Putnam County, IN (US); Brad E. Church, Putnam County, IN (US); David L. Shafer, Hendricks County, IN (US); Duane R. Summerlot, Putnam County, IN (US)

(73) Assignee: Magic Circle Corporation, Coatesville, IN (US)

( * ) Notice: Subject to any disclaimer, the term of this patent is extended or adjusted under 35 U.S.C. 154(b) by 158 days.

(21) Appl. No.: 09/642,230

(22) Filed: Aug. 21, 2000

(51) Int. Cl.[7] .................................................. F01M 5/00
(52) U.S. Cl. ........................ 184/6.12; 184/6.22; 415/112
(58) Field of Search .............................. 184/6.22, 6.23, 184/6.12, 104.1; 415/110, 111, 112, 175, 176; 416/122

(56) References Cited

U.S. PATENT DOCUMENTS

| | | | | |
|---|---|---|---|---|
| 2,802,548 A | * | 8/1957 | Mart et al. .................. | 184/6.12 |
| 4,271,717 A | * | 6/1981 | Milward et al. ............... | 74/467 |
| 4,274,505 A | * | 6/1981 | Maust ......................... | 180/215 |
| 4,738,327 A | * | 4/1988 | Takei ......................... | 180/68.1 |
| 4,841,797 A | * | 6/1989 | Cerrington et al. ........... | 74/467 |
| 4,869,054 A | * | 9/1989 | Hostetler et al. ................ | 56/6 |
| 4,957,187 A | * | 9/1990 | Burgess ..................... | 184/6.12 |

* cited by examiner

*Primary Examiner*—David A. Bucci
*Assistant Examiner*—Justin Stefanon
(74) *Attorney, Agent, or Firm*—Jack Schuman

(57) ABSTRACT

Gear box oil pumping system employs the teeth of a gear rotatably mounted within a gear box housing acting as paddles to move oil between the gear box housing and an oil reservoir.

6 Claims, 2 Drawing Sheets

GEAR BOX OIL PUMPING SYSTEM

BACKGROUND OF THE INVENTION

1. Field of the Invention

This invention relates, broadly speaking, to a gear box oil pumping system.

More specifically, this invention relates to a system in which a gear box pumps heated oil out of the gear box housing to a radiator for cooling and thence back to the gear box after cooling, via a reservoir.

Even more particularly, this invention relates to a system driving a riding lawn mower, in which the gear box pumps heated oil out of the gear box housing to a radiator for cooling and then back to the gear box, via a reservoir, fluid pumps and fluid motors turning the driving wheels of the lawn mower.

2. Description of the Prior Art

No systems similar to that disclosed herein are known to the inventors.

SUMMARY OF THE INVENTION

One of the objects of this invention is to provide a novel and efficient gear box oil pumping system.

Another of the objects of this invention is to provide a novel system in which the gear box pumps heated oil out of the gear box housing to a radiator for cooling, and thence back to the gear box after cooling.

A further object of this invention is to provide such a novel system in which the gear box oil travels to and from a reservoir.

Yet another object of this invention is to provide such a novel system for use with a riding lawn mower, in which the gear box oil travels through a fluid circuit including fluid pumps and wheel-driving fluid motors.

Still other and further objects of this invention will become apparent by reference to the accompanying specification and drawings, and to the appended claims.

The foregoing objects are attained by providing oil conduits communicating between the housing of a gear box and an oil reservoir, and by using one of the gears in the gear box to perform an additional function, viz. to pump cooled oil from the oil reservoir to the gear box housing, and to permit heated oil from the gear box housing to travel to the oil reservoir. Various other oil conduits conduct gear box oil from the oil reservoir to fluid pumps, fluid motors turning the wheel-driving motors of the lawn mower, and the radiator.

DESCRIPTION OF THE DRAWINGS

Referring now to the drawings, in which like numerals represent like parts in the several views.

DESCRIPTION OF THE PREFERRED EMBODIMENT

Figure 1:
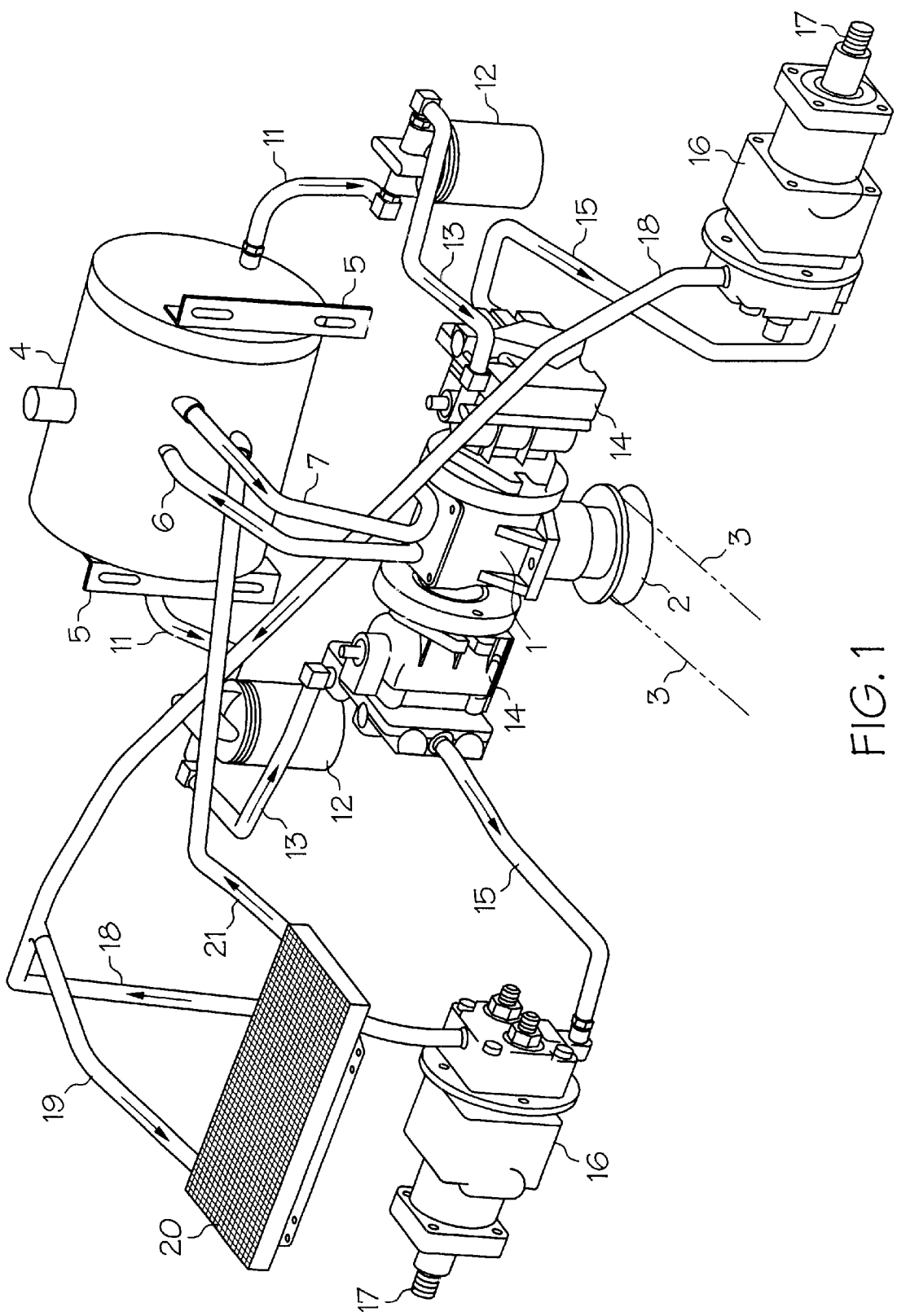
FIG. 1 represents a view in perspective of the novel system for handling gear box oil. The riding lawn mower on which the system is mounted and which is operated by the system is not shown, to avoid obfuscating this figure.

Gear box 1 is provided with pulley 2 operatively connected by means of belt 3 (shown in phantom) with the engine of the lawn mower.

Oil reservoir 4 is mounted on the lawn mower structure (not shown) by means of supports 5.

Oil conduit 6 communicates between the housing of the gear box 1 and the oil reservoir 4.

Oil conduit 7 also communicates between the housing of the gear box 1 and the oil reservoir 4.

Figure 2:
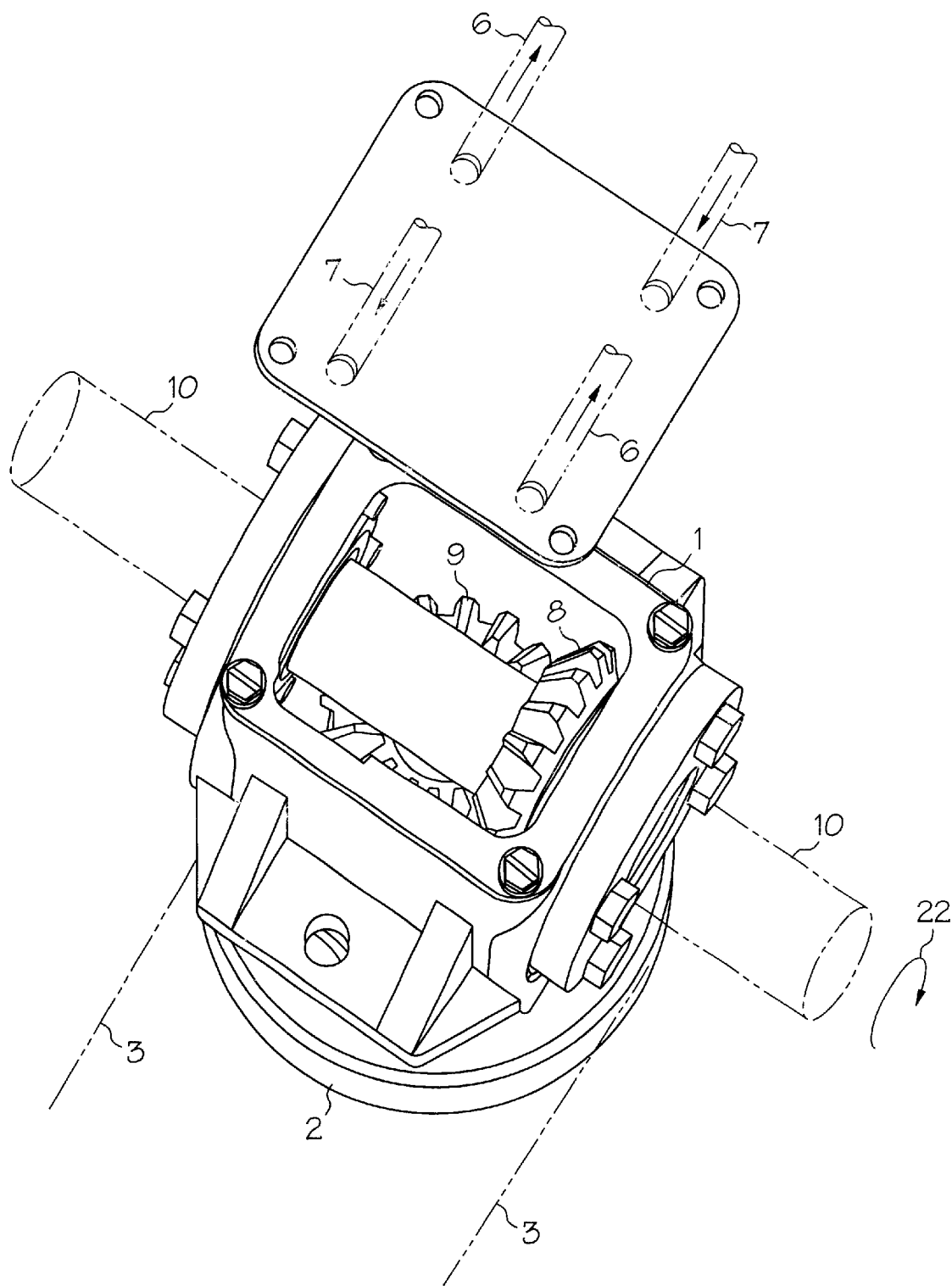
FIG. 2 represents an enlarged view in perspective of the interior of the gear box, with the cover removed.

As shown particularly in FIG. 2, gear 8 in gear box 1, driven by gear 9 in turn driven by pulley 2, drives spline shafts 10. The downwardly moving teeth of gear 8, acting like paddles, in effect suck oil out of oil reservoir 4, through oil conduit 7, into gear box 1. Oil in the gear box 1 is forced through oil conduit 6 into oil reservoir 4.

Baffle means, such as a screen (not shown) may be positioned within oil reservoir 4 between the point of entry of oil conduit 6 into oil reservoir 4 and the point of exit of oil conduit 7 from oil reservoir 4.

Oil from oil reservoir 4 is conducted through oil conduits 11 to oil filters 12, and thence through oil conduits 13 to oil pumps 14 driven by spline shafts 10.

Oil is pumped by oil pumps 14 through oil conduits 15 to fluid motors 16 driving the wheels (not shown) of the riding lawn mower, which wheels are mounted on axles 17.

Oil from fluid motors 16 travels through oil conduits 18 and 19 to radiator 20, in which the heated oil is cooled.

The cooled oil is then conducted from radiator 20, through oil conduit 21, to oil reservoir 4, and is then, as previously described, sucked back into gear box 1 by means of the teeth of gear 8, through oil conduit 7.

The arrows shown in the several oil conduits indicate diagrammatically the direction of flow of the oil.

In operation, the gear box 1, driven by the lawn mower engine through belt 3 and pulley 2, sucks cooled oil out of oil reservoir 4 through oil conduit 7. This withdrawal of cooled oil from the oil reservoir 4 into the gear box 1 in turn forces heated oil from the gear box 1 into the oil reservoir 4. This heated oil is then passed through oil filters 12, through oil pumps 14, and from oil pumps 14 to fluid motors 16 turning the wheels which propel the lawn mower.

The oil is then passed from the fluid motors 16 to the radiator 20 in which the oil is cooled. The cooled oil is returned to oil reservoir 4, by the action of the teeth of gear 8, into gear box 1.

One of the problems arising out of attempts to run the gear box 1 at a high speed, such as at 3600 rpm, is the heat generated therein which can raise the temperature of the gear box oil to an impermissable level. The system disclosed herein provides gear box oil as much as 200° F. lower in temperature than would otherwise obtain.

Gear 8 is shown in FIG. 2 as rotating in the direction indicated by arrow 22. This results in the sucking action of oil from oil reservoir 4 through oil conduit 7 into gear box 1. Alternatively, to obtain a different pressure drop in the oil circuit and to realize a different rate of flow in the oil circuit both of which may be advantageous under some circumstances, the cover of gear box 1 can be rotated 180° so that oil conduit 6 is in a position to receive oil pumped by the upward movement of the teeth of gear 8 as indicated in phantom in FIG. 2 and oil conduit 7 would be in a position remote from gear 8, again as shown in phantom in FIG. 2.

The various lawn mower controls which determine the speed and direction of travel of the riding lawn mower form no part of the present invention and, accordingly, have not been shown or otherwise described to simplify the drawings and the specification.

Since modifications and changes which do not depart from the spirit of the invention as disclosed herein may readily occur to those familiar with the art to which this invention pertains, the appended claims should be construed as covering all suitable modifications and equivalents.

We claim:

1. Gear box oil pumping system associated with an engine, said gear box oil pumping system comprising:
   (a) a gear box housing,
   (b) a first toothed gear rotatably mounted within said gear box housing,
   (c) means operatively connecting said first gear to said engine, whereby said first gear is caused to rotate,
   (d) a second toothed gear rotatably mounted within said gear box housing and meshed with said first gear, whereby rotation of said first gear causes said second gear to rotate,
   (e) an oil reservoir external to said gear box housing,
   (f) first oil conduit means communicating between said oil reservoir and said gear box housing adjacent said second gear,
   (g) second oil conduit means communicating between said oil reservoir and said gear box housing remote from said second gear,
   (h) whereby, due to rotation of said second gear, the teeth thereon acting as paddles suck oil from said oil reservoir through said first conduit means into said gear box housing,
   (i) and whereby introduction of oil from said oil reservoir through said first oil conduit means into said gear box housing forces oil from said gear box housing through said second oil conduit means into said oil reservoir,
   (j) a radiator having an entry port and an exit port,
   (k) third oil conduit means communicating between said oil reservoir and said entry port to feed heated oil from said oil reservoir into said radiator,
   (l) fourth oil conduit means communicating between the exit port of said radiator and said oil reservoir to feedcooled oil from said radiator to said oil reservoir.

2. Gear box oil pumping system associated with a riding lawn mower having an engine, said gear box oil pumping system comprising:
   (a) a gear box housing,
   (b) a first toothed gear rotatably mounted within said gear box housing,
   (c) means operatively connecting said first gear to said engine, whereby said first gear is caused to rotate,
   (d) a second toothed gear rotatably mounted within said gear box housing and meshed with said first gear, whereby rotation of said first gear causes said second gear to rotate,
   (e) a shaft connected to said second gear and caused to rotate by rotation of said second gear,
   (f) an oil reservoir,
   (g) first oil conduit means communicating between said oil reservoir and said gear box housing adjacent said second gear,
   (h) second oil conduit means communicating between said oil reservoir and said gear box housing remote from said second gear,
   (i) whereby, due to rotation of said second gear, the teeth thereon acting as paddles suck oil from said oil reservoir through said first oil conduit means into said gear box housing,
   (j) whereby introduction of oil from said oil reservoir through said first oil conduit means into said gear box housing forces oil from said gear box housing through said second oil conduit means into said oil reservoir,
   (k) a fluid pump having an inlet and an outlet and connected to and driven by said shaft,
   (l) third oil conduit means communicating between said oil reservoir and the inlet of said fluid pump,
   (m) a fluid motor having an inlet and an outlet,
   (n) an axle on said fluid motor and adapted to support a lawn mower driving wheel,
   (o) fourth oil conduit means communicating between the outlet of said fluid pump and the inlet of said fluid motor,
   (p) a radiator having an inlet port and an outlet port,
   (q) fifth oil conduit means communicating between the outlet of said fluid motor and the inlet port of said radiator,
   (r) sixth oil conduit means communicating between the outlet port of said radiator and said oil reservoir.

3. Gear box oil pumping system associated with an engine, said gear box oil pumping system comprising:
   (a) a gear box housing,
   (b) a first toothed gear rotatably mounted within said gear box housing,
   (c) means operatively connecting said first gear to said engine, whereby said first gear is caused to rotate,
   (d) a second toothed gear rotatably mounted within said gear box housing and meshed with said first gear, whereby rotation of said first gear causes said second gear to rotate,
   (e) an oil reservoir external to said gear box housing,
   (f) first oil conduit means communicating between said oil reservoir and said gear box housing adjacent said second gear,
   (g) second oil conduit means communicating between said oil reservoir and said gear box housing remote from said second gear,
   (h) whereby, due to rotation of said second gear, the teeth thereon acting as paddles pump oil from said gear box housing through said first oil conduit means into said oil reservoir,
   (i) and whereby introduction of oil from said gear box housing through said first oil conduit means into said oil reservoir forces oil from said oil reservoir through said second oil conduit means into said gear box housing,
   (j) a radiator having an entry port and an exit port,
   (k) third oil conduit means communicating between said oil reservoir and said entry port to feed heated oil from said oil reservoir into said radiator,
   (l) fourth oil conduit means communicating between the exit port of said radiator and said oil reservoir to feed cooled oil from said radiator to said oil reservoir.

4. Gear box oil pumping system associated with a riding lawn mower having an engine, said gear box oil pumping system comprising:
   (a) a gear box housing,
   (b) a first toothed gear rotatably mounted within said gear box housing,
   (c) means operatively connecting said first gear to said engine, whereby said first gear is caused to rotate,
   (d) a second toothed gear rotatably mounted within said gear box housing and meshed with said first gear, whereby rotation of said first gear causes said second gear to rotate, (e) a shaft connected to said second gear and caused to rotate by rotation of said second gear, (f) an oil reservoir, (g) first oil conduit means communicating between said oil reservoir and said gear box housing adjacent said second gear, (h) second oil conduit means communicating between said oil reservoir and said gear box housing remote from said second gear, (i) whereby, due to rotation of said second gear, the teeth thereon acting as paddles pump oil from said gear box housing through said first oil conduit means into said oil reservoir, (j) whereby introduction of oil from said gear box housing through said first oil conduit means into said oil reservoir forces oil from said oil reservoir through said second oil conduit means into said gear box housing, (k) a fluid pump having an inlet and an outlet and connected to and driven by said shaft, (l) third oil conduit means communicating between said oil reservoir and the inlet of said fluid pump, (m) a fluid motor having an inlet and an outlet, (n) an axle on said fluid motor and adapted to support a lawn mower driving wheel, (o) fourth oil conduit means communicating between the outlet of said fluid pump and the inlet of said fluid motor, (p) a radiator having an inlet port and an outlet port, (q) fifth oil conduit means communicating between the outlet of said fluid motor and the inlet port of said radiator, (r) sixth oil conduit means communicating between the outlet port of said radiator and said oil reservoir.

5. Gear box oil pumping system associated with an engine, said gear box oil pumping system comprising:

(a) a gear box housing, (b) a toothed gear rotatably mounted within said housing, (c) means operatively connecting said gear to said engine whereby said gear is caused to rotate, (d) an oil reservoir external to said gear box housing, (e) first oil conduit means communicating between said oil reservoir and said gear box housing adjacent said gear, (f) second oil conduit means communicating between said oil reservoir and said gear box housing remote from said gear, (g) whereby, due to rotation of said gear, the teeth thereon acting as paddles suck oil from said oil reservoir through said first oil conduit means into said gear box housing, (h) and whereby introduction of oil from said oil reservoir through said first oil conduit means into said gear box housing forces oil from said gear box housing through said second oil conduit means into said oil reservoir, (i) a radiator having an entry port and an exit port, (j) third oil conduit means communicating between said oil reservoir and said entry port to feed heated oil from said oil reservoir into said radiator, (k) fourth oil conduit means communicating between the exit port of said radiator and said oil reservoir to feed cooled oil from said radiator to said oil reservoir.

6. Gear box oil pumping system associated with an engine, said gear box oil pumping system comprising:

(a) a gear box housing, (b) a toothed gear rotatably mounted within said gear box housing, (c) means operatively connecting said gear to said engine whereby said gear is caused to rotate, (d) an oil reservoir external to said gear box housing, (e) first oil conduit means communicating between said oil reservoir and said gear box housing adjacent said gear, (f) second oil conduit means communicating between said oil reservoir and said gear box housing remote from said gear, (g) whereby, due to rotation of said gear, the teeth thereon acting as paddles pump oil from said gear box housing through said first oil conduit means into said oil reservoir, (h) and whereby introduction of oil from said gear box housing through said first oil conduit means into said oil reservoir forces oil from said oil reservoir through said second oil conduit means into said gear box housing, (i) a radiator having an entry port and an exit port, (j) third oil conduit means communicating between said oil reservoir and said entry port to feed heated oil from said oil reservoir into said radiator, (k) fourth oil conduit means communicating between the exit port of said radiator and said oil reservoir to feed cooled oil from said radiator to said oil reservoir.

* * * * *